US012297794B2

(12) United States Patent
Oba et al.

(10) Patent No.: US 12,297,794 B2
(45) Date of Patent: May 13, 2025

(54) EVAPORATED FUEL TREATMENT DEVICE

(71) Applicant: FUTABA INDUSTRIAL CO., LTD., Okazaki (JP)

(72) Inventors: Ayumi Oba, Okazaki (JP); Koji Iwamoto, Okazaki (JP); Tamami Ina, Okazaki (JP)

(73) Assignee: FUTABA INDUSTRIAL CO., LTD., Okazaki (JP)

( * ) Notice: Subject to any disclaimer, the term of this patent is extended or adjusted under 35 U.S.C. 154(b) by 0 days.

(21) Appl. No.: 18/619,646

(22) Filed: Mar. 28, 2024

(65) Prior Publication Data

US 2024/0328375 A1 Oct. 3, 2024

(30) Foreign Application Priority Data

Apr. 3, 2023 (JP) ................................. 2023-060142

(51) Int. Cl.
*F02M 25/08* (2006.01)

(52) U.S. Cl.
CPC ...... *F02M 25/089* (2013.01); *F02M 25/0872* (2013.01)

(58) Field of Classification Search
CPC ......................... F02M 25/089; F02M 25/0872
See application file for complete search history.

(56) References Cited

U.S. PATENT DOCUMENTS 8,992,673 B2 * 3/2015 Mani ...................... B01D 53/04 96/132
2015/0007799 A1 * 1/2015 Takeshita ........... F02M 25/0854 123/519
2017/0002770 A1 * 1/2017 Kosugi .................. B01D 53/04
2019/0249624 A1 8/2019 Seki
2022/0333559 A1 * 10/2022 Iwamoto ............ F02M 25/0872
2023/0149847 A1 * 5/2023 Iwamoto ............ B01D 53/0407 96/130

FOREIGN PATENT DOCUMENTS

| | | |
|---|---|---|
| JP | 2006083871 A | 3/2006 |
| JP | 2012127310 A | 7/2012 |
| WO | 2018079447 A1 | 5/2018 |

OTHER PUBLICATIONS

Notice of Reasons for Refusal for Japanese Patent Application No. 2023060142, mailed Mar. 11, 2025, 8 pages.

* cited by examiner

*Primary Examiner* — Xiao En Mo
(74) *Attorney, Agent, or Firm* — Withrow + Terranova, PLLC; Vincent K. Gustafson

(57) ABSTRACT

Provided is an evaporated fuel treatment device including a first coupling portion, a second coupling portion, a first accommodating portion and a second accommodating portion. The first accommodating portion is configured to be disposed so as to be in communication with the first coupling portion and the second coupling portion, and to accommodate a first adsorbent. The second accommodating portion is configured to be disposed so as to be in communication with the first coupling portion via the first accommodating portion, and to accommodate a second adsorbent. The evaporated fuel adsorption capacity of the first adsorbent is lower than the evaporated fuel adsorption capacity of the second adsorbent.

8 Claims, 8 Drawing Sheets

EVAPORATED FUEL TREATMENT DEVICE

CROSS-REFERENCE TO RELATED APPLICATIONS

The present application claims the benefit of Japanese Patent Application No. 2023-060142 filed on Apr. 3, 2023 with the Japan Patent Office, the entire disclosure of which is incorporated herein by reference.

BACKGROUND

The present disclosure relates to an evaporated fuel treatment device. For example, Japanese Patent Application Publication No. 2006-083871 proposes a technique in which, in an evaporated fuel treatment device, an adsorbent with relatively low evaporated fuel adsorption capacity is disposed in a chamber which is in communication with the atmosphere in order to reduce a leak of evaporated fuel into the atmosphere.

SUMMARY

However, a problem has been found in the technique of the aforementioned publication that, in an initial stage of a purge operation in which evaporated fuel is supplied to an internal combustion engine from the evaporated fuel treatment device, the concentration of the evaporated fuel to be supplied to the internal combustion engine increases easily. In order to make the concentration of the evaporated fuel appropriate in the initial stage of the purge operation, controls such as a reduction of the supply amount of purge air is required, which easily makes the control of the evaporated fuel treatment device more complicated.

One aspect of the present disclosure is to enable supplying evaporated fuel to an internal combustion engine at appropriate concentration without complicated controls in an evaporated fuel treatment device.

One mode of the present disclosure is an evaporated fuel treatment device. The evaporated fuel treatment device comprises a first coupling portion, a second coupling portion, a first accommodating portion and a second accommodating portion. The first coupling portion is configured to be coupled to a first pipe coupled to an internal combustion engine. The second coupling portion is configured to be coupled to a second pipe coupled to a fuel tank. The first accommodating portion is disposed so as to be in communication with the first coupling portion and the second coupling portion, and configured to accommodate a first adsorbent. The second accommodating portion is disposed so as to be in communication with the first coupling portion via the first accommodating portion, and configured to accommodate a second adsorbent. The evaporated fuel adsorption capacity of the first adsorbent is lower than the evaporated fuel adsorption capacity of the second adsorbent.

Here, supplying evaporated fuel to the internal combustion engine from the evaporated fuel treatment device is called “purge operation”. In the configuration of the present disclosure, evaporated fuel supplied to the first coupling portion in the initial stage of the purge operation mainly includes evaporated fuel desorbed from the first adsorbent. According to the configuration of the present disclosure, the evaporated fuel adsorption capacity of the first adsorbent is low, and therefore the concentration of the evaporated fuel becomes lower than that in a case where the evaporated fuel adsorption capacity of the first adsorbent is high. Accordingly, it is possible to prevent evaporated fuel of high concentration from being supplied to the internal combustion engine in the initial stage of the purge operation.

In one mode of the present disclosure, the volume of the first adsorbent may be smaller than the volume of the second adsorbent.

Such a configuration allows reduction of the absolute amount of fuel that the first adsorbent can adsorb, which thereby prevents the evaporated fuel of high concentration from being supplied in the initial stage of the purge operation.

In one mode of the present disclosure, the evaporated fuel treatment device may further comprise a housing and at least one filter. The first accommodating portion and the second accommodating portion may constitute a part of the housing. The first adsorbent and the second adsorbent may be arranged so as to be adjacent to each other inside the housing and in communication with each other via the at least one filter.

Such a configuration allows accommodation of the first adsorbent and the second adsorbent in the housing so as to interpose the at least one filter between the first adsorbent and the second adsorbent.

In one mode of the present disclosure, the housing may comprise outer surfaces, and the first coupling portion and the second coupling portion may be adjacently arranged on the same surface of the outer surfaces.

Such a configuration allows adsorption and desorption from the same direction.

In one mode of the present disclosure, where the same surface of the outer surfaces is an outer wall surface, the at least one filter may be disposed parallel to the outer wall surface.

Such a configuration allows the first adsorbent and the second adsorbent to be arranged in alignment with each other along the at least one filter, thereby it is possible to reduce occurrence of a gap as a dead space between the first adsorbent and the second adsorbent.

In one mode of the present disclosure, the evaporated fuel treatment device may further comprise a partition plate configured to separate a space adjacent to the first coupling portion from a space adjacent to the second coupling portion inside the housing.

Such a configuration comprising the partition plate allows restriction of a path in which evaporated fuel transfers between the space adjacent to the first coupling portion and the space adjacent to the second coupling portion inside the housing. For example, in a case where the first coupling portion and the second coupling portion are adjacently arranged on the same surface of the housing, it is possible to elongate the length of the path between the first coupling portion and the second coupling portion by disposing the partition plate. In this case, it is possible to prevent the evaporated fuel of high concentration supplied via the second coupling portion from being supplied immediately to the internal combustion engine via the first coupling portion.

In one mode of the present disclosure, the evaporated fuel treatment device may further comprise a first housing and a second housing. Preferably, the first housing includes the first accommodating portion, and the second housing includes the second accommodating portion. The first housing may comprise the first coupling portion and a third coupling portion. The third coupling portion is configured to be coupled to a coupling pipe configured to couple the first accommodating portion with the second accommodating portion. The second housing may comprise the second coupling portion, and a fourth coupling portion which is coupled to the coupling pipe.

Such a configuration can prevent the evaporated fuel of high concentration from being supplied even in a case where the first accommodating portion and the second accommodating portion are each disposed in different housings.

BRIEF DESCRIPTION OF THE DRAWINGS

Example embodiments of the present disclosure will be described hereinafter with reference to the accompanying drawings, in which.

DETAILED DESCRIPTION OF EXEMPLARY EMBODIMENT

Figure 1:
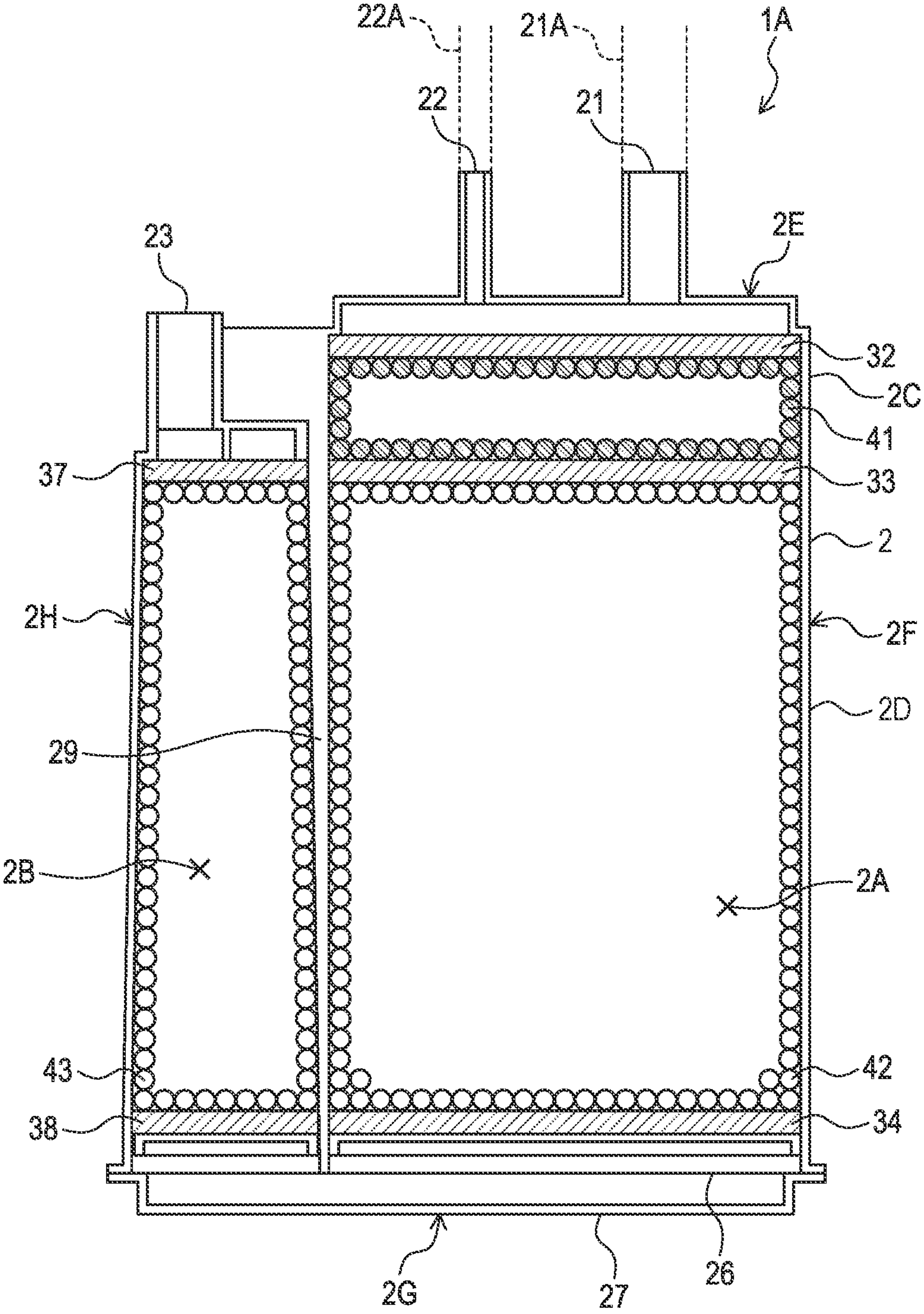
FIG. 1 is a cross sectional view of an evaporated fuel treatment device according to an embodiment.

Hereinafter, the embodiment of the present disclosure will be described with reference to the drawings.

1. Embodiment

[1-1. Correspondence Relationship Between Configurations of Embodiments and Configurations of the Present Disclosure]

A purge port 22 and a separate body purge port 22B of the embodiments correspond to one example of a first coupling portion of the present disclosure, and a charge port 21 of the embodiments corresponds to one example of a second coupling portion of the present disclosure. A coupling port 22D of the sixth modified embodiment also corresponds to one example of a third coupling portion of the present disclosure, and a purge port 22 of the sixth modified embodiment corresponds to one example of a fourth coupling portion of the present disclosure.

Further, a main body case 2 of the embodiment corresponds to one example of a housing of the present disclosure, a separate body case 50 of the embodiment corresponds to one example of a first housing of the present disclosure, and a main body case 2 of the embodiment corresponds to one example of a second housing of the present disclosure. Filters 33 and 34, and a separating wall 29 of the embodiment correspond to one example of a boundary surface of the present disclosure.

[1-2. Configuration]

An evaporated fuel treatment device 1A illustrated in FIG. 1 functions as a known canister. Specifically, the evaporated fuel treatment device 1A has a function to adsorb and desorb evaporated fuel generated in a fuel tank of a vehicle (illustration omitted). The evaporated fuel treatment device 1A comprises a main body case 2.

The main body case 2 includes an inner space. The main body case 2 is made of a synthetic resin, for example, but materials of the main body case 2 are not limited to the synthetic resin.

The main body case 2 comprises a charge port 21 and a purge port 22. The main body case 2 may comprise an atmosphere port 23. The ports 21 to 23 are arranged on the same side of the main body case 2. The ports 21 to 23 are arranged on the same surface of the main body case 2 (for example, on an upper outer surface (outer wall surface) 2E in FIG. 1). Particularly, the main body case 2 comprises outer surfaces 2E, 2F, 2G, 2H, and the like (hereinafter, referred to as outer surfaces 2E, and the like.), and the purge port 22 and the charge port 21 are adjacently arranged on the same surface of the outer surfaces 2E, etc. of the main body case 2. Each of the outer surfaces 2E, and the like forms an outer shell of the main body case 2 and contacts the outside air.

The ports 21 to 23 are arranged so that port directions of the ports 21 to 23 are aligned. The port directions are directions in which gas introduced into the ports 21 to 23 or gas discharged from the ports 21 to 23 is guided. The ports 21 to 23 are configured to guide the gas in the same direction.

The gas described herein is gas that flows inside the evaporated fuel treatment device 1A and that may contain the atmospheric air and evaporated fuel.

Hereinafter, a side of the main body case 2 where the charge port 21, the purge port 22, and the atmosphere port 23 are provided is referred to as "port side". The main body case 2 has an opening 26 on a side opposite to the port side. The opening 26 is closed by a cap 27 that functions as a lid.

The charge port 21 is configured to be coupled to a second pipe 21A coupled to the fuel tank of the vehicle. The charge port 21 is configured to intake evaporated fuel generated in the fuel tank into the evaporated fuel treatment device 1A.

The purge port 22 is configured to be coupled to a first pipe 22A coupled to an internal combustion engine such as an engine of the vehicle. The first pipe 22A may be coupled to an intake pipe (illustration omitted) via a purge valve (illustration omitted). The purge port 22 is configured to discharge evaporated fuel inside the evaporated fuel treatment device 1A from the evaporated fuel treatment device 1A to supply the evaporated fuel to the internal combustion engine.

The atmosphere port 23 is open to the atmosphere. The atmosphere port 23 discharges gas removed of the evaporated fuel to the atmosphere. As a result of the atmosphere port 23 intaking external gas (that is, purge gas), the evaporated fuel adsorbed by the evaporated fuel treatment device 1A is desorbed (that is, purge operation).

The inner space of the main body case 2 is divided into a first chamber 2A and a second chamber 2B. In one example, the first chamber 2A has a substantially rectangular parallelepiped shape or a circular cylindrical shape. The first chamber 2A of the present embodiment has a substantially rectangular parallelepiped shape. A port side end of the first chamber 2A is coupled to the charge port 21 and the purge port 22.

The main body case 2 includes a first accommodating portion 2C and a second accommodating portion 2D. The first accommodating portion 2C forms a part of the first chamber 2A, and is disposed so that an inner space formed by the first accommodating portion 2C is in communication with the purge port 22 and the charge port 21. The first accommodating portion 2C is configured to accommodate a first adsorbent 41 in its inner space.

The second accommodating portion 2D forms a part of the first chamber 2A, and is disposed so that an inner space formed by the second accommodating portion 2D is in communication with the purge port 22 via the inner space included in the first the accommodating portion 2C. The second accommodating portion 2D is configured to accommodate a second adsorbent 42. The second chamber 2B accommodates a third adsorbent 43. Note that the adsorbents 41 to 43 are partially shown in FIG. 1 and the like, and the accommodating portions 2C and 2D, and the second chamber 2B are filled with the adsorbents 41 to 43 respectively.

In one example, the adsorbents 41 to 43 are aggregates of pellets. The pellets are granular activated carbon. The pellets are produced by kneading powdery activated carbon with a binder and then molding it into a specific shape. Alternatively, an adsorbent other than the pellets, such as powdery activated carbon, may be disposed in the first chamber 2A.

The evaporated fuel adsorption capacity of the first adsorbent 41 is lower than the evaporated fuel adsorption capacity of the second adsorbent 42. Although it is optional, the evaporated fuel adsorption capacity of the third adsorbent 43 can be set identically to the evaporated fuel adsorption capacity of the second adsorbent 42, for example. The adsorbents 41 to 43 may comprise a diluent with relatively low evaporated fuel adsorption capacity. In a case where the adsorbents 41 to 43 comprise the diluent, the evaporated fuel adsorption capacity of the adsorbents 41 to 43 including the diluent is configured as described above.

The "evaporated fuel adsorption capacity" as used herein indicates an amount of fuel adsorption per unit volume of the adsorbent. For example, an effective butane working capacity (BWC), particularly ASTM BWC (Butane Working Capacity in accordance with ASTM D5228) can be used as the evaporated fuel adsorption capacity. The evaporated fuel adsorption capacity of the first adsorbent 41 is set at 1 to 8 g/dL as a BWC value, and the evaporated fuel adsorption capacity of the second adsorbent 42 is set at 11 to 20 g/dL as a BWC value.

A first filter 32 is disposed at the port side end of the first chamber 2A. Filters 32 to 34, 37 and 38 in the present embodiment include a fibrous or meshed material having a function to allow gas containing evaporated fuel to pass through and to restrict the adsorbents 41 to 43 to pass through. For example, a fibrous synthetic resin material or a fibrous metal material, or a meshed metal material can be used for the filters 32 to 34, 37, and 38.

A second filter 33 is disposed between the first adsorbent 41 and the second adsorbent 42 of the first chamber 2A. That is, the first adsorbent 41 and the second adsorbent 42 are arranged so as to be adjacent to each other inside one main body case 2, and to be in communication with each other via the second filter 33. In other words, the first adsorbent 41 and the second adsorbent 42 are arranged so as to interpose a boundary surface (the second filter 33 in the present embodiment) parallel to the outer wall surface of the main body case 2.

A third filter 34 is disposed at an end of the first chamber 2A on a side of a cap 27 (hereinafter referred to as "cap 27 side end"). The first adsorbent 41, the second filter 33 and the second adsorbent 42 are arranged in this order between the first filter 32 and the third filter 34.

The volume of the first adsorbent 41 is smaller than the volume of the second adsorbent 42 and the volume of the third adsorbent 43. The volume of the first adsorbent 41 is about one fifth of the volume of the second adsorbent 42, and about a half of the volume of the third adsorbent 43.

The cap 27 side end of the first chamber 2A is coupled to the second chamber 2B. Gas such as the gas containing evaporated fuel can travel back and forth between the first chamber 2A and the second chamber 2B inside the main body case 2. The first chamber 2A is divided from the second chamber 2B by a separating wall 29. The separating wall 29 is a plate-shaped member disposed substantially parallel to a side surface of the main body case 2.

The second chamber 2B includes a space having an elongated shape extending toward the atmosphere port 23 from a cap 27 side end of the second chamber 2B. In one example, the second chamber 2B has a substantially rectangular parallelepiped shape or a circular cylindrical shape. The second chamber 2B of the present embodiment has a substantially rectangular parallelepiped shape. A first filter 37 is disposed at a port side end of the second chamber 2B, and a second filter 38 is disposed at a cap 27 side end of the second chamber 2B. The third adsorbent 43 is disposed between the first filter 37 and the second filter 38 in the second chamber 2B.

[1-3. Effect]

According to the embodiment explained in detail above, the following effects can be obtained.

(1a) In the evaporated fuel treatment device 1A, the purge port 22 is configured to be coupled to the first pipe 22A coupled to the internal combustion engine. The charge port 21 is configured to be coupled to the second pipe 21A coupled to the fuel tank. The first accommodating portion 2C is configured to be in communication with the purge port 22 and the charge port 21, and to accommodate the first adsorbent 41. The inner space of the second accommodating portion 2D is configured to be in communication with the purge port 22 via the inner space of the first accommodating portion 2C, and to accommodate the second adsorbent 42. The evaporated fuel adsorption capacity of the first adsorbent 41 is lower than the evaporated fuel adsorption capacity of the second adsorbent 42.

Figure 2:
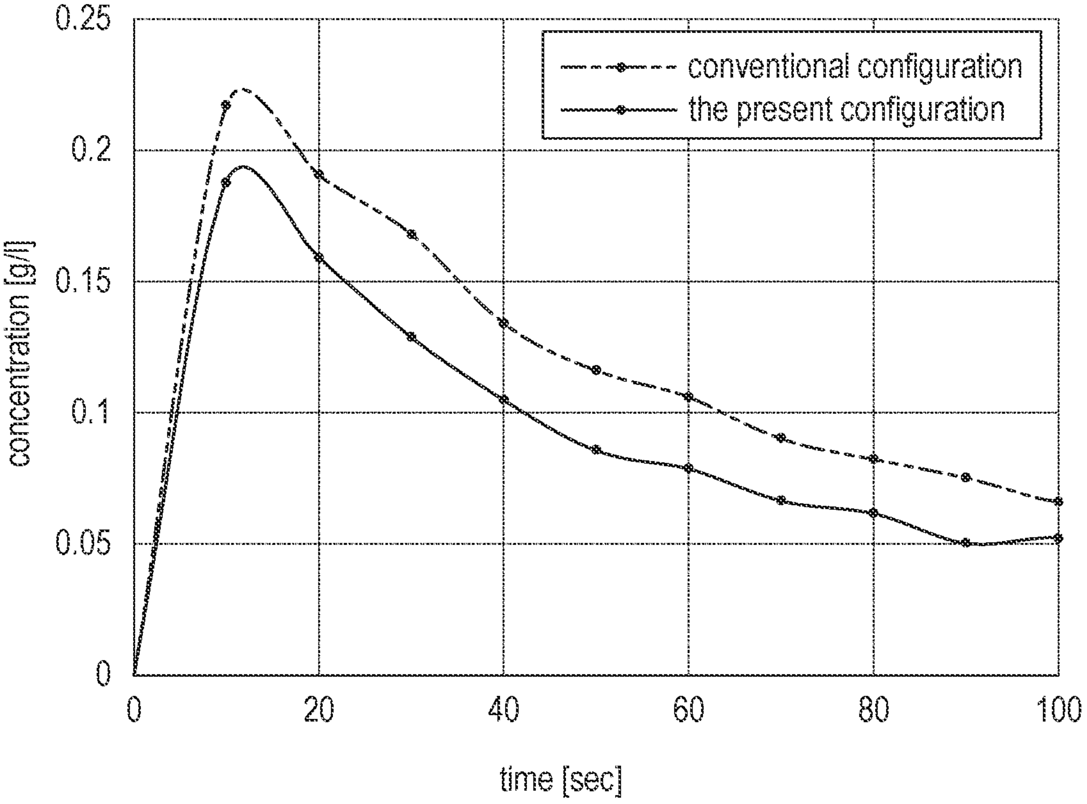
FIG. 2 is a graph showing relationship between duration of purge operation and concentration of evaporated fuel.

According to the configuration of the present embodiment, the evaporated fuel adsorption capacity of the first adsorbent 41 is low, and therefore the concentration of the evaporated fuel becomes lower than that in a case where the evaporated fuel adsorption capacity of the first adsorbent 41 is high. For example, FIG. 2 shows a graph comparing the evaporated fuel treatment device 1A of the aforementioned embodiment (the present configuration) and a configuration where the second adsorbent 42 is disposed in both of the first accommodating portion 2C and the second accommodating portion 2D (a conventional configuration). In FIG. 2, the horizontal axis indicates time after the initiation of the purge operation, and the vertical axis indicates the concentration of the evaporated fuel. According to the graph, it can be seen that, immediately after the initiation of the purge operation, the concentration of the evaporated fuel is suppressed to be lower in the present configuration than in the conventional configuration. Therefore, it is possible to prevent the evaporated fuel of high concentration from being supplied in the initial stage of the purge operation.

(1b) In the present embodiment, the volume of the first adsorbent 41 is smaller than the volume of the second adsorbent 42.

Such a configuration allows reduction of the absolute amount of fuel that the first adsorbent 41 can adsorb, thereby it is possible to prevent the evaporated fuel of high concentration from being supplied in the initial stage of the purge operation.

(1c) In the present embodiment, the evaporated fuel treatment device 1A further comprises one main body case 2 and at least one filter 33. The first accommodating portion 2C and the second accommodating portion 2D form a part of the main body case 2. The first adsorbent 41 and the second adsorbent 42 are arranged so as to be adjacent to each other inside the main body case 2, and to be in communication with each other via the filter 33.

Such a configuration allows the first adsorbent 41 and the second adsorbent 42 to be accommodated in the main body case 2 so as to interpose the at least one filter 33. Accordingly, the filter 33 can prevent the first adsorbent 41 and the second adsorbent 42 from being mixed with each other. Furthermore, the filter 33 can facilitate forming the boundary surface between the first adsorbent 41 and the second adsorbent 42.

(1d) In the present embodiment, the purge port 22 and the charge port 21 are adjacently arranged on the same surface (that is, the outer surface 2E) of the main body case 2.

Such a configuration allows adsorption and desorption from the same direction of the main body case 2.

(1e) In the present embodiment, the second filter 33 is disposed parallel to the outer wall surface of the main body case 2 on which the purge port 22 and the charge port 21 are adjacently arranged.

Such a configuration allows the first adsorbent 41 and the second adsorbent 42 to be arranged in alignment with each other along the second filter 33, thereby it is possible to reduce the occurrence of a gap as a dead space between the first adsorbent 41 and the second adsorbent 42.

2. Other Embodiments

Although the embodiment of the present disclosure has been described above, the present disclosure should not be limited to the aforementioned embodiment, and may be practiced in various forms.

(2a) Although the aforementioned embodiment provides a configuration in which the inside of the first chamber 2A is not divided, the present disclosure should not be limited thereto. For example, a partition plate 30A that divides the inside of the first chamber 2A may be provided as in an evaporated fuel treatment device 1B of a first modified example illustrated in FIG. 3. The partition plate 30A is configured to separate a space adjacent to the purge port 22 from a space adjacent to the charge port 21 inside the main body case 2.

More specifically, the partition plate 30A has a rectangular plate shape. The partition plate 30A is disposed so that an upper side of the partition plate 30A, which is one side of the rectangle, is in contact with one of inner surfaces of the main body case 2, where the one of inner surfaces is on the port side of the main body case 2. In addition, two sides of the partition plate 30A adjacent to the upper side of the partition plate 30A are each in contact with two inner side surfaces of the main body case 2 facing each other. Furthermore, a lower side of the partition plate 30A facing the upper side of the partition plate 30A is disposed in the first adsorbent 41. The first filter 32 is disposed on both sides of the partition plate 30A. The lower side of the partition plate 30A is positioned "inside the first accommodating portion 2C, particularly, between the first filter 32 and the second filter 33". The lower side of the partition plate 30A is disposed so as to contact the first adsorbent 41 without contacting the second filter 33.

Such a configuration comprising the partition plate 30A allows restriction of a path in which evaporated fuel transfers between the space adjacent to the purge port 22 and the space adjacent to the charge port 21 inside the main body case 2. In a case, as in the present embodiment, where the purge port 22 and the charge port 21 are adjacently arranged on the same surface of the main body case 2, it is possible to elongate the length of the path from the purge port 22 to the charge port 21 by comprising the partition plate 30A. In this case, it is possible to prevent the evaporated fuel of high concentration supplied via the charge port 21 from being supplied immediately to the purge port 22.

Figure 4:
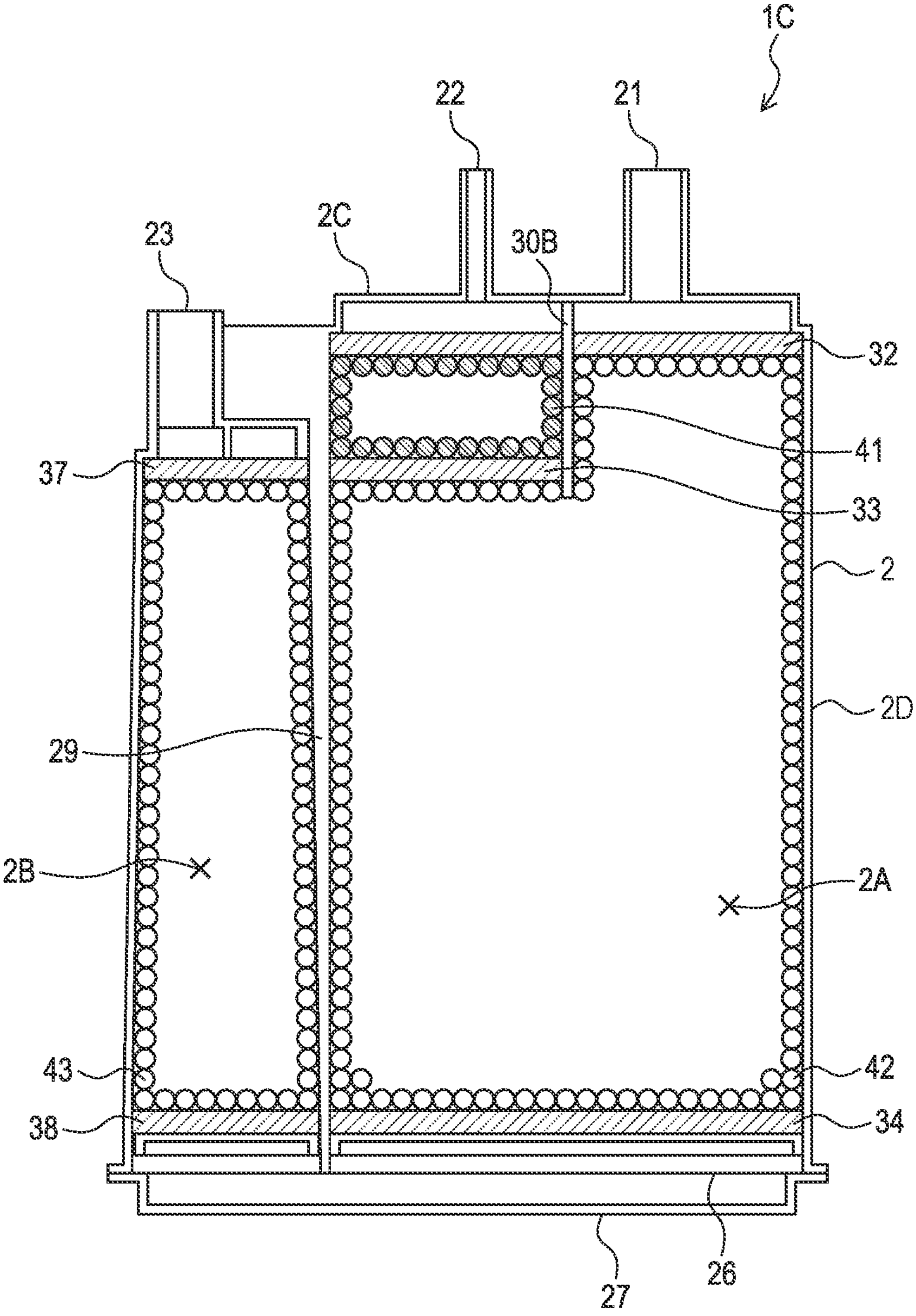
FIG. 4 is a cross-sectional view of a second modified example of the evaporated fuel treatment device.

(2b) In one mode of the present disclosure, a partition plate 30B may be provided as in an evaporated fuel treatment device 1C of a second modified example illustrated in FIG. 4. The partition plate 30B is disposed so that a lower side of the partition plate 30B facing an upper side of the partition plate 30B is extended beyond the second filter 33 and disposed in the second adsorbent 42. The first adsorbent 41 and the second filter 33 are disposed only in a space on a side of the purge port 22 relative to the partition plate 30B. The second adsorbent 42 is disposed in a space on a side of the charge port 21 relative to the partition plate 30B and on the cap 27 side relative to the second filter 33. As illustrated in FIG. 4, the first accommodating portion 2C is in communication with the charge port 21 via the second accommodating portion 2D.

Figure 3:
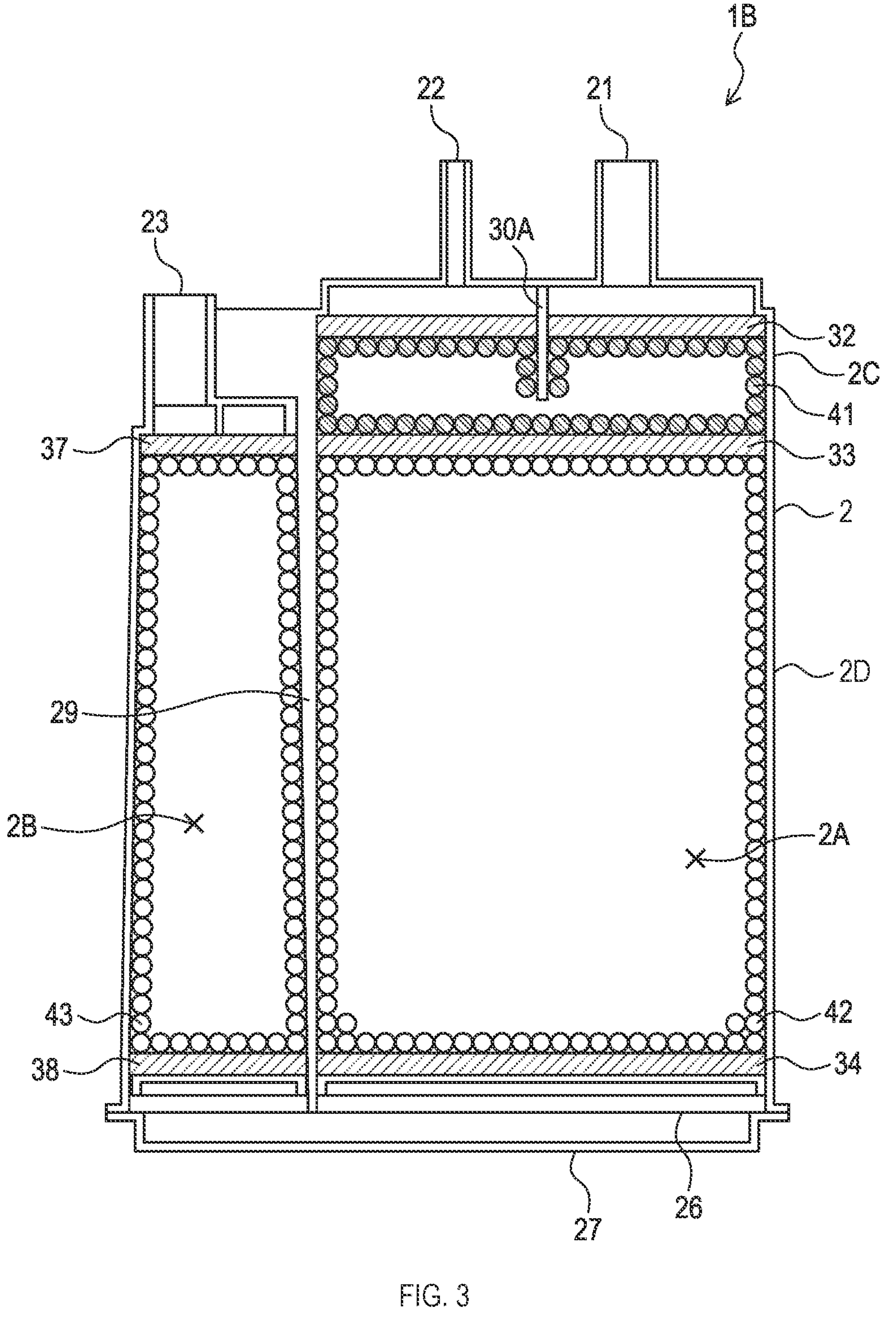
FIG. 3 is a cross-sectional view of a first modified example of the evaporated fuel treatment device.
Figure 5:
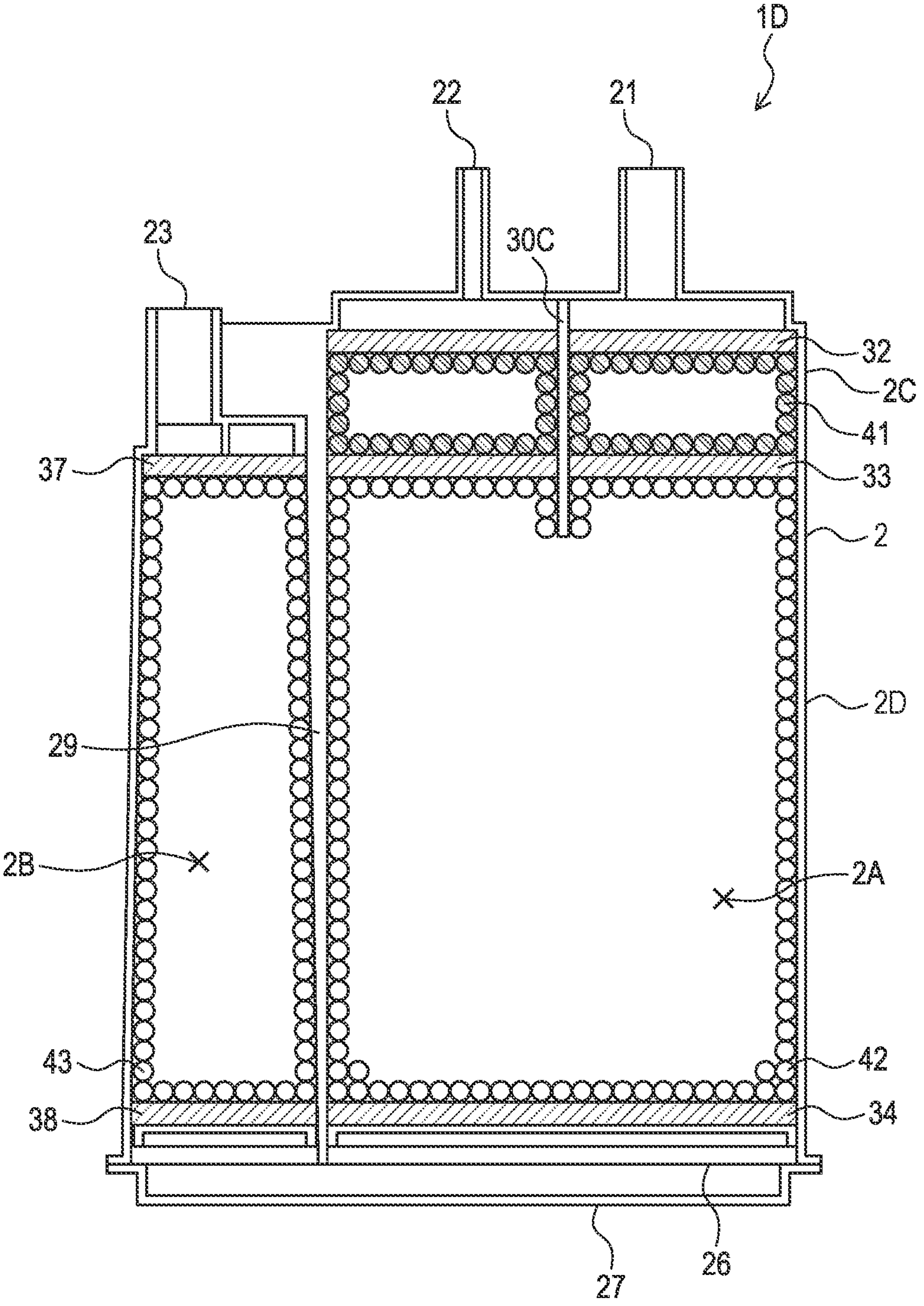
FIG. 5 is a cross-sectional view of a third modified example of the evaporated fuel treatment device.

(2c) In one mode of the present disclosure, a partition plate 30C may be provided as in an evaporated fuel treatment device ID of a third modified example illustrated in FIG. 5. The partition plate 30C is disposed in a manner that the partition plate 30A in the first modified example illustrated in FIG. 3 is extended beyond the second filter 33. Each of the first filter 32, the second filter 33, and the first adsorbent 41 is disposed on both sides of the partition plate 30C. A lower side of the partition plate 30C is positioned "inside the second accommodating portion 2D, particularly, between the second filter 33 and the third filter 34". The lower side of the partition plate 30C is disposed so as to contact the second adsorbent 42 without contacting the third filter 34. Also, the lower side of the partition plate 30C does not contact the cap 27.

Figure 6:
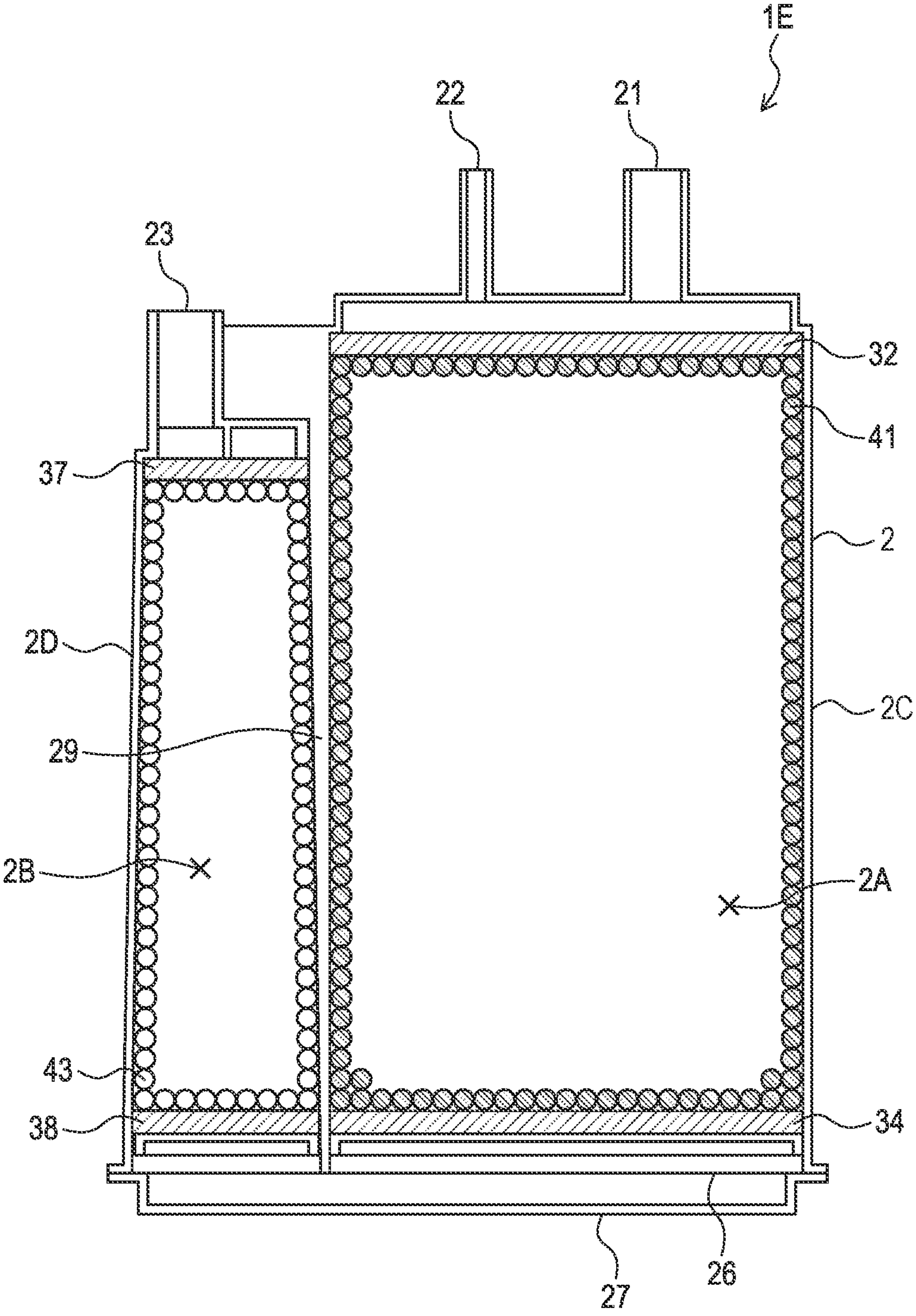
FIG. 6 is a cross-sectional view of a fourth modified example of the evaporated fuel treatment device.

(2d) In one mode of the present disclosure, only the first adsorbent 41 may be disposed in the first chamber 2A as in an evaporated fuel treatment device 1E of a fourth modified example illustrated in FIG. 6. In this case, the third adsorbent 43 prepared in a manner similar to the second adsorbent 42 may be disposed in the second chamber 2B.

Figure 7:
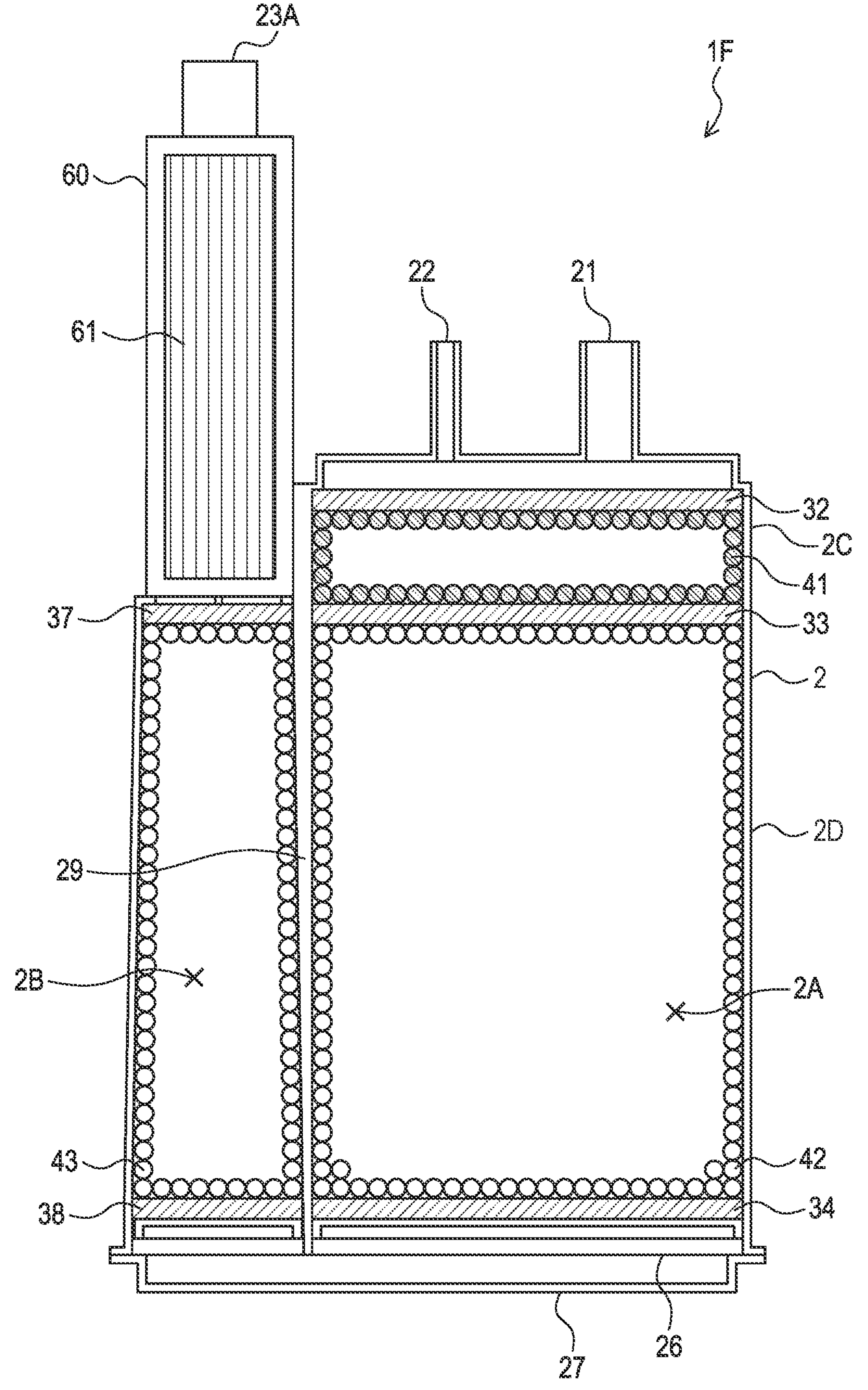
FIG. 7 is a cross-sectional view of a fifth modified example of the evaporated fuel treatment device.

(2e) In one mode of the present disclosure, an optional module may be coupled to the atmosphere port 23 (illustration omitted in FIG. 7) as in an evaporated fuel treatment device 1F of a fifth modified example illustrated in FIG. 7. For example, an activated carbon unit 60 is provided in the example illustrated in FIG. 7. The activated carbon unit 60 comprises a port portion 23A that communicates inside of the activated carbon unit 60 with outside of the activated carbon unit 60, and an adsorbent 61 disposed inside the activated carbon unit 60. The adsorbent 61 is, for example, a honeycomb-shaped activated carbon or a fibrous activated carbon.

As the optional module coupled to the atmosphere port 23, for example, an ELCM (that is, Evaporative Leak Check Module) or the like may be provided. The ELCM is a module to perform a leak inspection on the evaporated fuel treatment device 1A.

Figure 8:
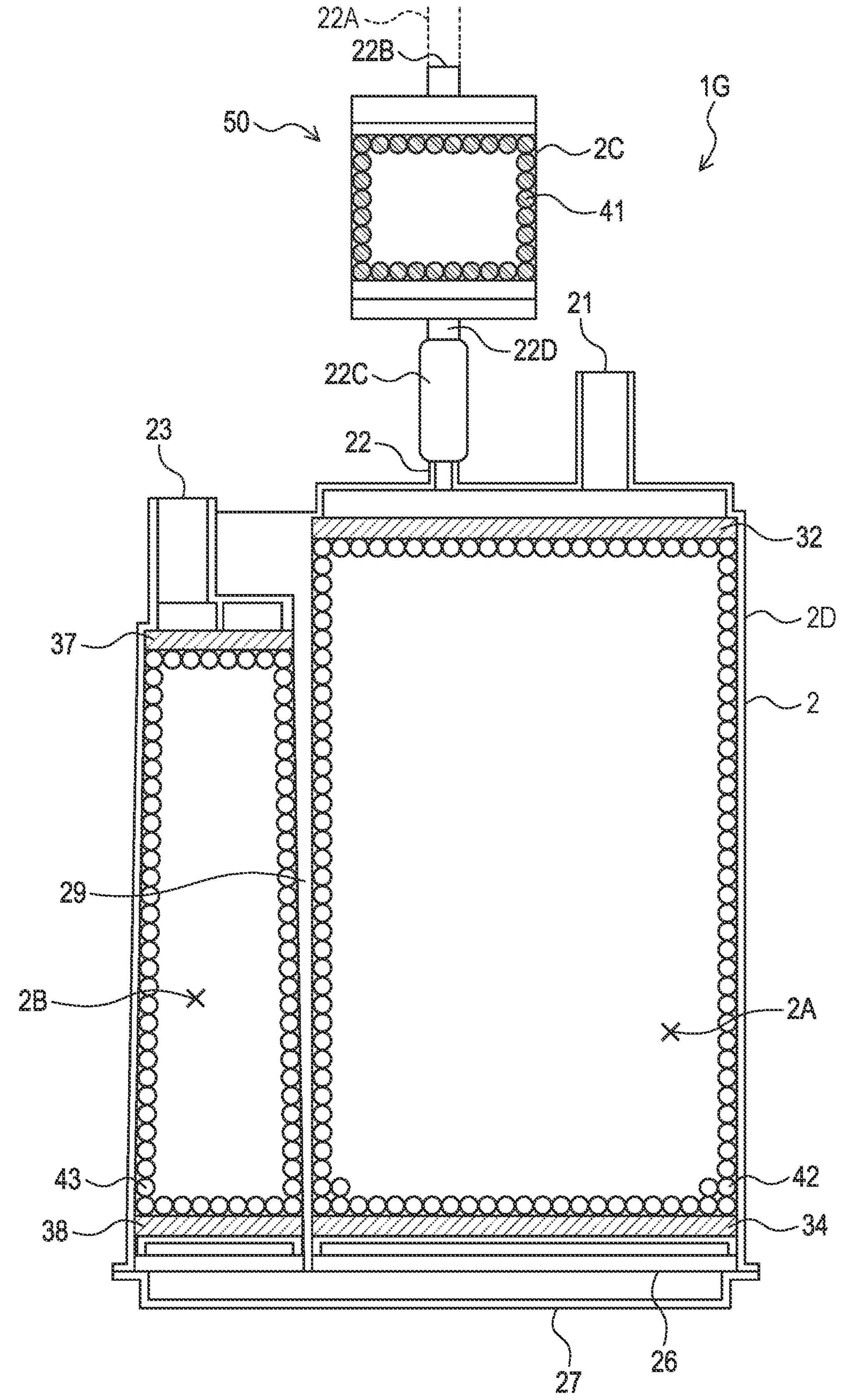
FIG. 8 is a cross-sectional view of a sixth modified example of the evaporated fuel treatment device.

(2f) In one mode of the present disclosure, a separate body case 50 may be attached to the purge port 22 as in an evaporated fuel treatment device 1G of a sixth modified example illustrated in FIG. 8. The evaporated fuel treatment device 1G of the sixth modified example comprises the separate body case 50 and the main body case 2. The separate body case 50 includes the first accommodating portion 2C. The main body case 2 includes the second accommodating portion 2D.

The first accommodating portion 2C accommodates the first adsorbent 41, and the second accommodating portion 2D accommodates the second adsorbent 42. In this case, the first accommodating portion 2C forms the inner space of the separate body case 50, and the second accommodating portion 2D forms the inner space of the first chamber 2A as a whole. As illustrated in FIG. 8, the first accommodating portion 2C is in communication with the charge port 21 via the second accommodating portion 2D.

The separate body case 50 further comprises a separate body purge port 22B and a coupling port 22D. The separate body purge port 22B is coupled to the first pipe 22A. The coupling port 22D is configured to be coupled to a coupling pipe 22C for coupling the separate body case 50 with the main body case 2. One end of the coupling pipe 22C is coupled to the purge port 22, and the other end of the coupling pipe 22C is coupled to the coupling port 22D.

Such a configuration can prevent the evaporated fuel of high concentration from being supplied even in a case where the first accommodating portion 2C is included in the separate body case 50, and the second accommodating portion 2D is included in the main body case 2.

(2g) Two or more functions performed by one element in the aforementioned embodiments may be achieved by two or more elements. One function performed by one element may be achieved by two or more elements. Two or more functions performed by two or more elements may be achieved by one element. One function performed by two or more elements may be achieved by one element. A part of the configuration in the aforementioned embodiments may be omitted. At least a part of the configuration in the aforementioned embodiments may be added to or replaced with another part of the configuration in the aforementioned embodiments. It should be noted that any and all modes included in the technical ideas that are identified by the languages recited in the present disclosure are embodiments of the present disclosure.

(2h) In addition to the evaporated fuel treatment devices 1A to 1G described above, the present disclosure can be achieved in various modes such as a system comprising the evaporated fuel treatment devices 1A to 1G or a method of treating evaporated fuel.

[Technical Ideas Disclosed in Present Disclosure]

[Item 1]

An evaporated fuel treatment device comprising:

a first coupling portion configured to be coupled to a first pipe coupled to an internal combustion engine;

a second coupling portion configured to be coupled to a second pipe coupled to a fuel tank;

a first accommodating portion configured to be disposed so as to be in communication with the first coupling portion and the second coupling portion, and to accommodate a first adsorbent; and a second accommodating portion configured to be disposed so as to be in communication with the first coupling portion via the first accommodating portion, and to accommodate a second adsorbent;

wherein the evaporated fuel adsorption capacity of the first adsorbent is lower than the evaporated fuel adsorption capacity of the second adsorbent.

[Item 2]

The evaporated fuel treatment device according to Item 1, wherein a volume of the first adsorbent is smaller than a volume of the second adsorbent.

[Item 3]

The evaporated fuel treatment device according to Item 1 or 2, further comprising a housing and at least one filter, wherein the first accommodating portion and the second accommodating portion constitute a part of the housing, and wherein the first adsorbent and the second adsorbent are arranged so as to be adjacent to each other inside the housing, and to be in communication with each other via the at least one filter.

[Item 4]

The evaporated fuel treatment device according to Item 3, wherein the housing comprises outer surfaces, and wherein the first coupling portion and the second coupling portion are adjacently arranged on a same surface of the outer surfaces.

[Item 5]

The evaporated fuel treatment device according to Item 4, wherein the same surface of the outer surfaces is an outer wall surface, and wherein the filter is disposed parallel to the outer wall surface.

[Item 6]

The evaporated fuel treatment device according to any one of Items 3 to 5, further comprising a partition plate configured to separate a space adjacent to the first coupling portion from a space adjacent to the second coupling portion inside the housing.

[Item 7]

The evaporated fuel treatment device according to Item 1 or 2, further comprising:

a first housing including the first accommodating portion; and a second housing including the second accommodating portion, wherein the first housing includes the first coupling portion, and a third coupling portion configured to be coupled to a coupling pipe configured to couple the first accommodating portion with the second accommodating portion, and wherein the second housing includes the second coupling portion, and a fourth coupling portion coupled to the coupling pipe.

What is claimed is:

1. An evaporated fuel treatment device comprising a first chamber and a second chamber, wherein the first chamber comprises:

a first coupling portion configured to be coupled to a first pipe coupled to an internal combustion engine;

a second coupling portion configured to be coupled to a second pipe coupled to a fuel tank;

a first accommodating portion configured to be disposed so as to be in communication with the first coupling portion and the second coupling portion, and to accommodate a first adsorbent; and a second accommodating portion configured to be disposed so as to be in communication with the first coupling portion via the first accommodating portion, and to accommodate a second adsorbent, wherein the second chamber comprises an atmosphere port that communicates with an atmosphere and is configured to accommodate a third adsorbent, and wherein an evaporated fuel adsorption capacity of the first adsorbent that indicates an amount of fuel adsorption per unit volume of the first adsorbent is lower than an evaporated fuel adsorption capacity of the second adsorbent that indicates an amount of fuel adsorption per unit volume of the second adsorbent.

2. The evaporated fuel treatment device according to claim 1, wherein a volume of the first adsorbent is smaller than a volume of the second adsorbent.

3. The evaporated fuel treatment device according to claim 1, further comprising a housing and at least one filter, wherein the first accommodating portion and the second accommodating portion constitute a part of the housing, and wherein the first adsorbent and the second adsorbent are arranged so as to be adjacent to each other inside the housing, and to be in communication with each other via the at least one filter.

4. The evaporated fuel treatment device according to claim 3, wherein the housing comprises outer surfaces, and wherein the first coupling portion and the second coupling portion are adjacently arranged on a same surface of the outer surfaces.

5. The evaporated fuel treatment device according to claim 4, wherein the same surface of the outer surfaces is an outer wall surface, and wherein the filter is disposed parallel to the outer wall surface.

6. The evaporated fuel treatment device according to claim 3, further comprising a partition plate configured to separate a space adjacent to the first coupling portion from a space adjacent to the second coupling portion inside the housing.

7. The evaporated fuel treatment device according to claim 1, further comprising:

a first housing including the first accommodating portion; and a second housing including the second accommodating portion, wherein the first housing includes the first coupling portion, and a third coupling portion configured to be coupled to a coupling pipe configured to couple the first accommodating portion with the second accommodating portion, and wherein the second housing includes the second coupling portion, and a fourth coupling portion coupled to the coupling pipe.

8. The evaporated fuel treatment device according to claim 1, wherein a volume of the first adsorbent is smaller than a volume of the second adsorbent, and the volume of the first adsorbent is smaller than a volume of the third adsorbent.

* * * * *